United States Patent [19]

Eisenbarth

[11] 4,244,715

[45] Jan. 13, 1981

[54] DUST REMOVAL APPARATUS

[75] Inventor: Manfred Eisenbarth, Zweibrucken, Fed. Rep. of Germany

[73] Assignee: Mannesmann Demag AG, Duisburg, Fed. Rep. of Germany

[21] Appl. No.: 91,507

[22] Filed: Nov. 5, 1979

[30] Foreign Application Priority Data

Jul. 6, 1979 [DE] Fed. Rep. of Germany ....... 2927317

[51] Int. Cl.$^3$ .............................. B01D 46/02
[52] U.S. Cl. ...................................... 55/315; 55/319; 55/350; 55/341 NT
[58] Field of Search .......... 55/96, 97, 341 R, 341 NT, 55/341 M, 341 H, 341 MC, 341 PC, 341 HM, 350, 342, 343, 315

[56] References Cited

FOREIGN PATENT DOCUMENTS

| | | | |
|---|---|---|---|
| 1916612 | 11/1964 | Fed. Rep. of Germany | 55/282 |
| 2117088 | 10/1972 | Fed. Rep. of Germany | 55/282 |
| 2345344 | 6/1977 | Fed. Rep. of Germany | 55/282 |
| 1407941 | 5/1978 | Fed. Rep. of Germany | 55/302 |
| 445994 | 7/1912 | France | 55/287 |
| 831303 | 5/1938 | France | 55/319 |

*Primary Examiner*—Bernard Nozick
*Attorney, Agent, or Firm*—Mandeville and Schweitzer

[57] ABSTRACT

Compact pollution control and/or dust removal apparatus is provided for removing entrained dust particles and/or other dry pollutants from an air or gas flow. The apparatus provides for a single pollutant particle discharge in a first or initial removal housing with a plurality of secondary removal housings mounted in spaced fashion circumferentially around the initial removal housing. The construction is such that the gas flow being treated is subjected to two reverse flow patterns for particle removal. Collected pollutants may be flushed from the secondary removal housings by a counter-current flushing action and the use of a simplified valving arrangement wherein the collected pollutants are accumulated into a single area for discharge. The compact arrangement eliminates long horizontal flow pipes which have a tendency to clog with accumulated particles.

5 Claims, 3 Drawing Figures

DUST REMOVAL APPARATUS

The invention relates to a dust removal apparatus with a filter case arranged separately from the dust pre-separator, and connected to the latter via at least one gas conduit and operated especially for dry processes. Such dust removal apparatus pertains to the kind where the filter case is combined with a pre-separator, and operated in a parallel connection. In a parallel connection, at least one of several filter cases can always be flushed or rinsed in counterflow while the other filter cases are in normal operation during this period. In addition to the principle of parallel connection, it is necessary to avoid transporting the dust from the filter cases over long distances, and particularly over horizontal delivery lines where lumping and caking of the dust occurs.

German DE-AS No. 23 45 344 discloses the connection of a crude gas pipe emerging from the dust pre-separator with several filter cases positioned in a parallel arrangement in order to satisfy the following requirement. Each filter case may, at the inlet side, be connected or disconnected via a first controllable lock and, on the outlet side, may be on the one hand connected to a purified gas pipe via passages open at all times, and on the other hand may be connected via a second controllable lock to a dust removal pipe leading to the inlet of the dust pre-separator. Apart from the resulting excessive length of the dust vent pipe, this arrangement requires a great deal of space for the filter cases. Of particular disadvantage, however, is the arrangement of control flaps at the vertical pipes within the filter cases sealing against the dust removal pipe. An additional shutoff valve is required at an intermediate dust separator in order to seal against the atmosphere. Such multiple sealing makes maintenance of the filter cases more difficult.

It is the object of the invention to form a space-saving arrangement of the filter cases in relation to the dust pre-separator with a simpler sealing against the atmosphere and, at the same time, improve upon the maintenance characteristics of the filter cases. This is done by connecting several filter cases at the inlet by means of separate crude gas pipes directly to the dust pre-separator, and by connecting the filter cases at the outlet also by means of separate purified gas pipes directly to a purified gas manifold, so that at the inlet, as well as at the outlet, each filter case is coordinated with shutoff valves, and from the filter cases separate dust removal pipes empty into the dust pre-separator. This solution has the advantage of placing the filter cases closer to the dust pre-separator, thus achieving a considerable saving in space. The feeding of the dust, separated in the filter cases, directly into the dust pre-separator obviates a double sealing at the outlet of the filter cases, whereby the only existing packing seal serves in the cutoff of each filter case for maintenance purposes, and during the rinse cycle.

The invention also permits the dividing of the entire gas quantity to be cleansed of dust into a multitude of smaller individual filter cases in a compact construction, whereby the operating safety of the dust removal apparatus is considerably increased. Furthermore, the invention may, advantageously, be installed subsequently into existing dust removal plants. It is further of particular advantage that the discharge of the dust from the dust removal apparatus is done in one single location only, thus eliminating long transport lines for the accumulated dust. In this respect, long horizontal transport lines are avoided.

The invention provides a spacing-saving arrangement, according to another feature of the invention, in that the filter cases are coordinated with a centrally located dust pre-separator in concentric distribution over the circumference. An improvement on the dust removal efficiency, as well as longer rinse intervals for the filter elements in the filter cases, can be achieved, furthermore, by providing filter elements in the filter cases and by providing a dust pre-separation chamber in each filter case in the area of the connection for the dust removal pipe.

Another use for the invention for low and high pressure gas purification, according to the dry purification principle, is found in that the filter cases are formed as pressure-proof housings for pressures in excess of 0.2 bar.

An example of the invention is shown in the drawings and described in detail as follows.

DETAILED DESCRIPTION OF THE INVENTION

Figure 1:
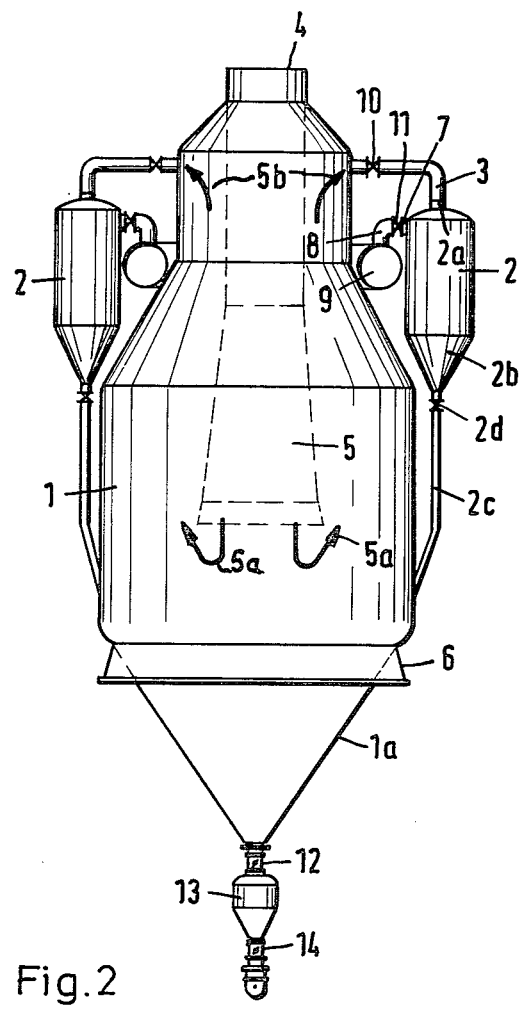
FIG. 1 shows a side elevational view of dust removal apparatus illustrating the invention.

The dust removal apparatus is provided with the dust pre-separator 1 and several (as shown here, twelve) filter cases 2, which are each connected at an inlet 2a by means of a crude gas pipe 3 directly to the dust pre-separator 1. The inlet 4 of the dust pre-separator 1 is formed as an expansion pipe 5. The dust pre-separator 1 is supported via the base 6 on bearings, foundations, or building structures of a plant, not shown. Each filter case 2 is connected at outlet 7 by means of a short purified gas pipe 8 to the purified gas manifold 9. Each crude gas pipe 3 may be closed by means of a shutoff valve 10, and each purified gas pipe 8 by means of a shutoff valve 11. From the conical dust bunkers 2b, dust removal pipes 2c lead to the conical dust bunker 1a of the dust pre-separator 1.

Figure 2:
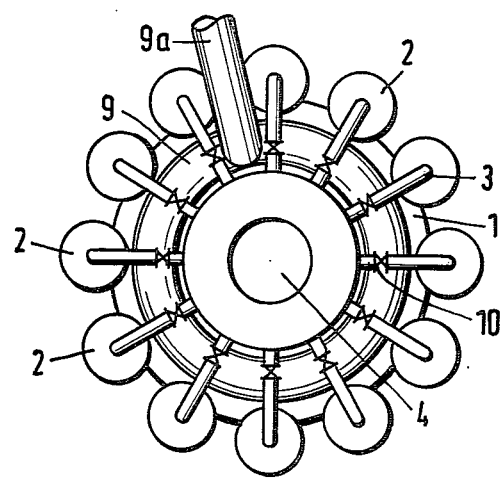
FIG. 2 shows a top plan view of the apparatus of FIG. 1.

The entire dust separated by means of the apparatus disclosed, therefore, accumulates in the single dust bunker 1a which may be closed at the bottom by a first shutoff valve 12. Below the shutoff valve 12, the lock chamber 13 is positioned, and below the latter another second shutoff valve 14. The entire dust quantity separated by means of the dust removal apparatus is discharged from one location, i.e. at the lock chamber 13. FIG. 2 shows that the dust pre-separator 1 forming the center for the twelve filter cases 2 spaced around its circumference.

Figure 3:
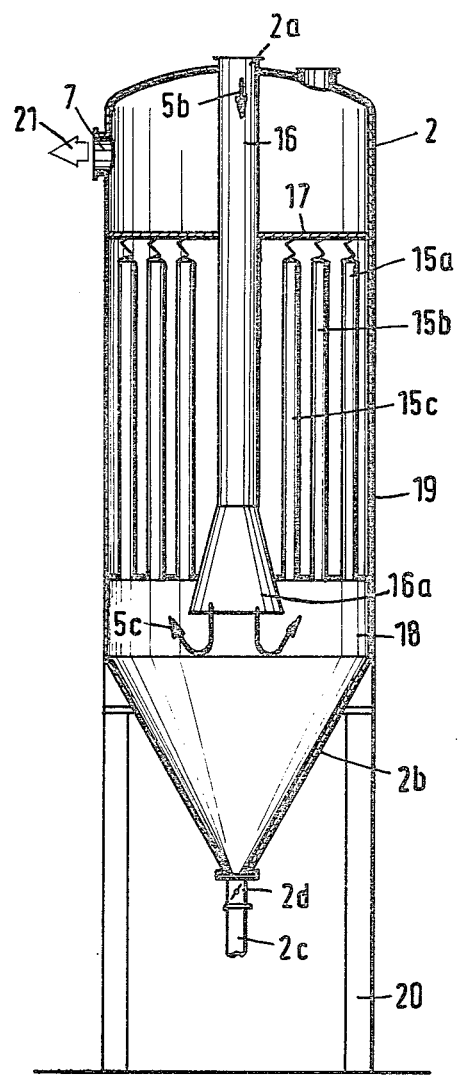
FIG. 3 shows a vertical axial sectional view illustrating the compact filter cases formed.

In FIG. 3, the filter cases 2 are shown equipped with filter elements 15a, 15b, 15c attached to a suspension 17 in concentric rows around an expansion pipe 16. The expansion pipe 16 empties with its conical flare 16a into the pre-separation chamber 18 followed by the dust bunker 2b. Preferably, the dust bunker 2b is closed only by means of the single shutoff valve 2d, and does not have to be doubly sealed against the atmosphere on account of the connection to the dust pre-separator 1. Furthermore, the filter cases 2 are provided with gas pressure-proof housings 19 for pressures in excess of 0.2 bar. The filter cases 2 further rest on stands 20 which are placed on brackets (not shown) of the dust pre-separator 1, or on independent support surfaces.

The dust removal apparatus described operates as follows: Blast-furnace gas or other dust-charged gases which, in their purified state are to be fed to another use, such as an energy recovery plant, or sent as purified gas through a stack into the atmosphere without polluting the environment, go through inlet 4 into the expansion pipe 5 of the dust pre-separator 1, where they are subject to a vertical deflection, as shown by arrows 5a, whereby heavy dust particles are separated according to the principle of mass force separation. The separated dust accumulates in the dust bunker 1a. The dust gas continues to flow in the direction of arrows 5b and, with shutoff valves 10 (FIG. 2) being opened, through the expansion pipe 16 into the deflection direction 5c, so that another dust separation according to the mass force separation principle takes place.

The gas, now charged with dust particles of smaller grain size, flows through the filter elements 15 (a, b, c), and is purified as far as possible. The purified gas leaves each filter case 2 through an outlet 7, open shutoff valve 11, then through the purified gas pipe 8, and thus flows as purified gas 21 into the purified gas manifold 9. From there, the gas flows through the purified gas outflow 9a (FIG. 2) into the mentioned energy recovery plant, where the inherent heat is utilized, and/or sent into the atmosphere through a stack. The dust separated by the filter case 2 accumulates in the dust bunker 2b, whereby such dust drops down during rinse cycles from the filter elements 15 (a, b, c). The dust moves through the dust removal pipe 2c with opened shutoff valve 2d, and closed shutoff valve 11 into the dust bunker 1a of the dust pre-separator 1.

I claim:

1. Apparatus for removing dust and other dry contaminant particles from a contaminated gas flow, comprising
   (a) a dust pre-separator housing;
   (b) an inlet in the top of said pre-separator housing;
   (c) an outlet in the bottom of said pre-separator housing;
   (d) a diverging expansion pipe extending from said inlet to a point spaced from said outlet; the improvement characterized by
   (e) a plurality of secondary filter cases having gas inlets and outlets in the top thereof and positioned adjacent said pre-separator housing;
   (f) a plurality of secondary gas outlets adjacent the top of said pre-separator housing;
   (g) first flow communication means connecting each of said secondary gas outlets to one of said gas inlets of said secondary filter cases;
   (h) a purified gas manifold;
   (i) second flow communication means connecting the outlets of said secondary filter cases to said purified gas manifold;
   (j) valve means in said first and second flow communication means; and
   (k) a dust removal outlet in the bottom of each said secondary filter case;
   (l) each said dust removal outlet connected to the bottom of said dust pre-separator housing adjacent the outlet thereof.

2. The apparatus of claim 1, further characterized by
   (a) each said secondary filter case comprised of a pressure-proof housing for pressures in excess of 0.2 bars.

3. The apparatus of claim 1, further characterized by
   (a) said plurality of secondary filter cases are spaced circumferentially around said pre-separator housing.

4. The apparatus of claim 3, further characterized by each said secondary filter case includes
   (a) a plurality of axially extending filter elements; and
   (b) a dust pre-separator chamber in the bottom thereof;
   (c) said dust pre-separator chamber connected to said dust removal outlet.

5. The apparatus of claim 4, further characterized by each said secondary filter case further includes
   (a) a diverging expansion pipe extending axially downwardly from said inlet to a point spaced above said dust pre-separation chamber; and
   (b) valve means in said dust removal outlet.

* * * * *